(12) United States Patent
Gilbert et al.

(10) Patent No.: US 10,007,510 B2
(45) Date of Patent: *Jun. 26, 2018

(54) UPDATING SOFTWARE

(71) Applicant: International Business Machines Corporation, Armonk, NY (US)

(72) Inventors: David A. Gilbert, Manchester (GB); David Haikney, Manchester (GB); James W. Walker, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/994,105

(22) Filed: Jan. 12, 2016

(65) Prior Publication Data

US 2016/0162285 A1    Jun. 9, 2016

Related U.S. Application Data

(62) Division of application No. 13/980,342, filed as application No. PCT/IB2012/050111 on Jan. 10, 2012, now Pat. No. 9,317,276.

(30) Foreign Application Priority Data

Jan. 19, 2011    (EP) ..................... 11151339

(51) Int. Cl.
 *G06F 9/44*     (2018.01)
 *G06F 9/445*    (2018.01)
 (Continued)

(52) U.S. Cl.
 CPC .............. *G06F 8/67* (2013.01); *G06F 8/60* (2013.01); *G06F 8/65* (2013.01); *G06F 8/656* (2018.02);
 (Continued)

(58) Field of Classification Search
 CPC ..... G06F 8/61; G06F 8/65; G06F 8/67; G06F 8/68; G06F 8/71; G06F 11/3664; G06F 11/368
 See application file for complete search history.

(56) References Cited

U.S. PATENT DOCUMENTS 7,725,703 B2    5/2010  Hunter et al.
8,200,790 B1    6/2012  Reeves et al.
(Continued)

FOREIGN PATENT DOCUMENTS

CN    1469252 A    1/2004
CN    1801091 A    7/2006
(Continued)

OTHER PUBLICATIONS

Wagner et al., "Lightweight Attestation and Secure Code Update for Multiple Separated Microkernel Tasks", Springer, Nov. 2013, ISC 2013, LNCS 7807, pp. 20-36; <www.springer.com/cda/content/document/cda.../9783319276588-c2.pdf?SGWID . . . >.*

(Continued)

*Primary Examiner* — Thuy Dao
*Assistant Examiner* — Ben C Wang
(74) *Attorney, Agent, or Firm* — Stephen R. Yoder

(57) ABSTRACT

This invention relates to a method and apparatus for updating software. In particular this invention relates to a method, system and computer program for updating an operating system in a hypervisor comprising: determining a new version of a component of the operating system; installing the new component version;

measuring an identifying characteristic of the component and making it available to an attestation system; notifying the attestation system that a component has been updated to a new version whereby, when the attestation system finds that the identifying characteristic of the new component (Continued)

does not match a pre-stored attestation value it is aware that a legitimate mis-match could have occurred. The installing of the new version of the component comprises: identifying an updater associated with new version of the component; measuring an identifying characteristic of the identified updater; loading and installing the new version of the component; and making both the identifying measurement of the updater and the new version of the component available to the attestation system.

19 Claims, 10 Drawing Sheets

(51) Int. Cl.
    *G06F 8/60*     (2018.01)
    *G06F 8/65*     (2018.01)
    *G06F 9/455*     (2018.01)
    *G06F 21/57*     (2013.01)
    *G06F 9/4401*     (2018.01)
    *G06F 8/70*     (2018.01)
    *G06F 8/656*     (2018.01)
    *G06F 11/36*     (2006.01)
    *G06F 8/71*     (2018.01)
(52) U.S. Cl.
    CPC .............. *G06F 8/70* (2013.01); *G06F 9/4406* (2013.01); *G06F 9/45558* (2013.01); *G06F 11/3688* (2013.01); *G06F 21/575* (2013.01); *G06F 8/71* (2013.01); *G06F 11/3664* (2013.01); *G06F 2009/45562* (2013.01)

(56) References Cited

U.S. PATENT DOCUMENTS

| | | | |
|---|---|---|---|
| 8,296,561 B2 | 10/2012 | Kanemura et al. | |
| 8,555,049 B2 | 10/2013 | Takayama et al. | |
| 8,566,815 B2 | 10/2013 | Schaefer et al. | |
| 8,631,404 B2* | 1/2014 | Laor | G06F 8/65 718/1 |
| 8,667,263 B2* | 3/2014 | Challener | G06F 21/57 375/371 |
| 8,677,108 B2 | 3/2014 | Nicolson et al. | |
| 8,677,115 B2 | 3/2014 | Paris et al. | |
| 8,806,579 B1 | 8/2014 | Angus et al. | |
| 8,887,144 B1 | 11/2014 | Marr et al. | |
| 8,892,858 B2 | 11/2014 | Smith et al. | |
| 9,021,465 B2* | 4/2015 | Laor | G06F 9/4555 717/138 |
| 9,026,771 B2 | 5/2015 | Ibrahim et al. | |
| 9,059,978 B2 | 6/2015 | Kotani et al. | |
| 9,086,917 B1 | 7/2015 | Fitzgerald et al. | |
| 9,176,752 B1* | 11/2015 | Marr | G06F 9/4411 |
| 9,244,743 B1* | 1/2016 | Scott | G06F 9/5077 |
| 9,317,276 B2* | 4/2016 | Gilbert | G06F 8/65 |
| 2003/0037231 A1 | 2/2003 | Goodman et al. | |
| 2003/0084138 A1 | 5/2003 | Tavis et al. | |
| 2005/0039013 A1 | 2/2005 | Bajikar et al. | |
| 2005/0223221 A1 | 10/2005 | Proudler et al. | |
| 2005/0278535 A1 | 12/2005 | Fortune et al. | |
| 2006/0005000 A1 | 1/2006 | King et al. | |
| 2006/0020781 A1 | 1/2006 | Scarlata et al. | |
| 2006/0143600 A1 | 6/2006 | Cottrell et al. | |
| 2006/0256108 A1 | 11/2006 | Scaralata | |
| 2007/0033652 A1 | 2/2007 | Sherwani et al. | |
| 2008/0027871 A1 | 1/2008 | Seo | |
| 2008/0086629 A1 | 5/2008 | Dellow | |
| 2008/0235754 A1 | 9/2008 | Wiseman et al. | |
| 2008/0244553 A1* | 10/2008 | Cromer | G06F 21/572 717/168 |
| 2008/0270781 A1 | 10/2008 | Ibrahim et al. | |
| 2008/0288783 A1 | 11/2008 | Jansen et al. | |
| 2009/0019285 A1 | 1/2009 | Chen et al. | |
| 2009/0165117 A1 | 6/2009 | Brutch et al. | |
| 2009/0204964 A1 | 8/2009 | Foley et al. | |
| 2009/0210702 A1 | 8/2009 | Welingkar et al. | |
| 2009/0327686 A1 | 12/2009 | Kochar et al. | |
| 2010/0287544 A1* | 11/2010 | Bradfield | G06F 21/53 717/172 |
| 2011/0145598 A1 | 6/2011 | Smith et al. | |
| 2011/0173643 A1* | 7/2011 | Nicolson | G06F 21/575 719/328 |
| 2011/0202917 A1* | 8/2011 | Laor | G06F 8/65 718/1 |
| 2011/0213953 A1* | 9/2011 | Challener | G06F 21/57 713/2 |
| 2011/0239210 A1 | 9/2011 | Kotani et al. | |
| 2011/0271270 A1 | 11/2011 | Bowen | |
| 2011/0296201 A1 | 12/2011 | Monclus et al. | |
| 2012/0084549 A1 | 4/2012 | Mackintosh et al. | |
| 2012/0096450 A1* | 4/2012 | Schaefer | G06F 21/572 717/168 |
| 2012/0131334 A1* | 5/2012 | Haikney | G06F 21/57 713/156 |
| 2012/0151199 A1 | 6/2012 | Shriver | |
| 2012/0151206 A1 | 6/2012 | Paris et al. | |
| 2012/0151209 A1 | 6/2012 | Visnyak et al. | |
| 2012/0159469 A1* | 6/2012 | Laor | G06F 9/4555 717/173 |
| 2012/0174095 A1* | 7/2012 | Natchadalingam | G06F 8/65 718/1 |
| 2012/0265976 A1 | 10/2012 | Spiers et al. | |
| 2012/0254624 A1 | 11/2012 | Malkhasyan et al. | |
| 2012/0297057 A1 | 11/2012 | Ghosh et al. | |
| 2013/0179872 A1* | 7/2013 | Kuzmack | G06F 8/665 717/173 |
| 2013/0185812 A1 | 7/2013 | Lie et al. | |
| 2013/0212369 A1* | 8/2013 | Imtiaz | G06F 21/575 713/2 |
| 2013/0239089 A1 | 9/2013 | Eksten et al. | |
| 2013/0298244 A1 | 11/2013 | Kumar et al. | |
| 2014/0013327 A1 | 1/2014 | Sherwood et al. | |
| 2014/0025939 A1 | 1/2014 | Smith et al. | |
| 2014/0173686 A1 | 6/2014 | Kgil et al. | |
| 2014/0245261 A1 | 8/2014 | Eksten et al. | |
| 2014/0298091 A1 | 10/2014 | Carlen et al. | |
| 2015/0007313 A1* | 1/2015 | Mackintosh | G06F 21/575 726/22 |
| 2015/0127795 A1 | 5/2015 | Jagana et al. | |
| 2015/0135311 A1 | 5/2015 | Mackintosh et al. | |
| 2015/0347280 A1* | 12/2015 | Bennah | G06F 11/3688 714/38.1 |
| 2016/0371105 A1* | 12/2016 | Sieffert | G06F 9/45545 |
| 2017/0235951 A1* | 8/2017 | Harrison | G06F 8/61 726/24 |
| 2017/0322790 A1* | 11/2017 | Surdu | G06F 8/65 |

FOREIGN PATENT DOCUMENTS

| | | |
|---|---|---|
| CN | 101542439 A1 | 9/2009 |
| CN | 101657792 A | 2/2010 |
| EP | 1980970 A2 | 10/2008 |
| JP | 2006323814 A | 11/2006 |
| JP | 2010257180 A | 11/2010 |
| JP | 2009015818 A | 7/2017 |
| WO | 2008004525 A1 | 10/2008 |
| WO | 2009096181 A1 | 8/2009 |
| WO | 2009044533 A1 | 9/2009 |
| WO | 2010127679 A1 | 11/2010 |

OTHER PUBLICATIONS

Thober et al., "JMF: Java Measurement Framework—Language-supported Runtime Integrity Measurement", ACM, STC'12, Oct. 2012, pp. 21-32; <https://dl.acm.org/citation.cfm?id=2382542>.*

Bente et al., "On Remote Attestation for Google Chrome OS", IEEE, Sep. 2012, pp. 376-383; <http://ieeexplore.ieee.org/stamp/stamp.jsp?tp=&arnumber=6354852>.*

(56) References Cited

OTHER PUBLICATIONS

IBM Copyright and Trademark Information—United States, updated Jan. 2016 <http://www.ibm.com/legal/us/en/copytrade.shtml>.

Ahmad-Reza Sadeghi and Christian Stüble, Property-based attestation for computing platforms: caring about properties, not mechanisms, [Online] 2004 In Proceedings of the 2004 workshop on New security paradigms (NSPW 04). ACM, New York, NY, USA, [Retrieved from the Internet] <http://dl.acm.org/citation.cfm?doid=1065907.1066038> pp. 67-77.

Shi et al., BIND: a fine-grained attestation service for secure distributed systems, [Online] May 8-11, 2005, in Security and Privacy, 2005 IEEE Symposium on, [Retrieved from the Internet] <http://ieeexplore.ieee.org/xpl/login.jsp?tp=&arnumber=1425065&url=http%3A%2F%2Fieeexplore.ieee.org%2Fxpls%2Fabs_all.jsp%3Farnumber%3D1425065> pp. 154-168.

Anbang Ruan and Andrew Martin, RepCloud: achieving fine-grained cloud TCB attestation with reputation systems, [Online] 2011, In Proceedings of the sixth ACM workshop on Scalable trusted computing (STC '11). ACM, New York, NY, USA, [Retrieved from the Internet] <http://dl.acm.org/citation.cfm?id=2046586> pp. 3-14.

Eisenbarth et al., Establishing Chain of Trust in Reconfigurable Hardware, [Online] Apr. 23-25, 2007, in Field-Programmable Custom Computing Machines, 2007. FCCM 2007. 15th Annual IEEE Symposium on, [Retrieved from the Internet] <http://ieeexplore.ieee.org/xpl/login.jsp?tp=&arnumber=4297269&url=http%3A%2F%2Fieeexplore.ieee.org%2Fxpls%2Fabs_all.jsp%3Farnumber%3D4297269> pp. 289-290.

Wenjuan Xu et al., "DR@FT: Efficient Remote Attestation Framework for Dynamic Systems," Sep. 20, 2010, Computer Security A Esorics 2010, Springer Berlin Heidelberg, pp. 182-198.

Li Shang Jie et al., "A Privacy-Preserving Integrity Measurement Architecture," 2010 Third International Symposium on Electronic Commerce and Security (ISECS), IEEE, Piscataway, NJ, USA, Jul. 29, 2010, pp. 242-246.

Hans Lohr et al., "Patterns for Secure Boot and Secure Storage in Computer Systems", Feb. 15-18, 2010, International Conference on Availability, Reliability, and Security 2010, pp. 569-573.

Thomas Eisenbarth et al., "Reconfigurable Trusted Computing in Hardware", Proceedings of the 2007 ACM Workshop on Scalable Trusted Computing, pp. 15-20.

Qiang Yan et al., "A Software-Based Root-of-Trust Primitive on Multicore Platforms", Proceedings of the 6th ACM Symposium on Information, Computer, and Communications Security, pp. 334-343, Hong Kong, Mar. 22-24, 2011.

Sadeghi, Ahmad-Reza, "Property-Based Attestation Approach and Virtual TPM", Horst Gortz Institute for IT-Security, Ruhr-University, Bochum, Germany, ReTrust Meeting, Villach 2008, pp. 1-69.

Korthaus, Rene et al., "A Practical Property-Based Bootstrap Architecture", STC '09, Nov. 13, 2009, pp. 29-38.

Trusted Computing Group, "TCG Mobile Reference Architecture", Specification version 1.0, Revision 1, Jun. 12, 2007, pp. 1-7.

* cited by examiner

UPDATING SOFTWARE

TECHNICAL FIELD

This invention relates to a method and apparatus for updating software. In particular this invention relates to trusted boot and remote attestation processes. Trusted computing, trusted boot, and remote attestation, as described in this specification, generally relate to technology standards developed by a standards group called the Trusted Computing Group.

BACKGROUND

Trusted boot is a procedure for booting and establishing a chain of trust in a trusted computing system. Components of the boot can be cryptographically measured and stored in a secure device, for example a Trusted Platform Module (TPM). Each boot component measures and stores in the secure device a characteristic measurement of the next boot component, this measurement is taken before control is transferred to the measured component. Once the system is running, the measurements can be extracted for inspection by a remote system using a remote attestation process, for example by Direct Anonymous Attestation (DAA). A sequence of measurements is described as a chain of trust.

Computer systems are frequently updated with new features and software fixes. An update may need to change a boot component which forms part of the chain of trust and after such an update remote attestation will show a change of measurement; the chain of trust will be broken. With many systems and many updates this scales into a larger difficult management problem. The change of measurement will only "show" after at a minimum a re-measure. The re-measure may only occur at reboot, or occur at run-time (depending on how the system is built).

Therefore, there is a need in the art to address the aforementioned problem.

SUMMARY OF INVENTION

In a first aspect of the invention there is provided a method for updating code in an executing environment comprising: installing new code; measuring an identifying characteristic of the new code and making the identifying characteristic available to an attestation system; notifying the attestation system that code has been updated to a new version whereby, when the attestation system finds that the identifying characteristic of the new code does not match a pre-stored attestation value it is aware that a legitimate mis-match could have occurred.

In the preferred embodiment, code is a component used in the boot process but it could also refer to another component in the chain-of-trust that is not booted. In other embodiments, code a whole or part of firmware, a hypervisor, a virtual machine, an operating system, or application. New code can be a new version of a component or a completely new component.

A pre-stored attestation value is a reference used by the attestation system to test for a valid identifying characteristic of a system component. The pre-stored attestation value is saved in the attestation system by system administration or acquired by some initializing process whereby an initial identifying characteristic of a component is trusted and used by the attestation system as the attestation value.

Advantageously the method further comprises determining the existence of a new version of an operating system component whereby the updating stage is performed automatically.

The invention notifies the attestation system of the update but attestation values can only be updated by the attestation system or by a system administrator. Only in a less secure embodiment could attestation values be updated by the hypervisor. In the preferred embodiment the hypervisor has no access to the attestation system except by notifications; the attestation system must perform an attestation directly after the notification whereby it checks the origin of the new version of the component. Once it has verified the origin of the new component it can, after a future reboot, accept the boot measurement of the new component even if it does not match the stored attestation value.

A hypervisor notification stage is added to the known software update process so that the chain of trust starts with the hypervisor. In the preferred embodiment the notification stage consists of the updated system notifying the attesting system with a "test me" message so that the attestation system is aware that a new measurement has been made. The attestation notification stops the attesting system from panicking when the attested system reboots and encounters different measurements.

The preferred embodiment allows a trusted component such as the hypervisor to participate in the measuring process and measure another component so that the attesting system can trust the measured component.

Advantageously, the installing of the new version (651.N) of the component (616.N) comprises: identifying an updater (612.N) associated with new version (651.N) of the component; measuring an identifying characteristic of the identified updater (612.N); installing the new version (651.N) of the component; and making the identifying measurement (PCR17) of the updater available to the attestation system (620) whereby the attestation system (620) can match the identifying measurement (PCR17) of the updater (612.N) to a pre-stored attestation value (624.N) to validate a legitimate update. For clarity and for example only, reference numbers from FIG. 6 have been added to the above paragraph.

More advantageously, the attestation system, directly after the notification, checks the origin of the new version of the component that it finds in the hypervisor. In the preferred embodiment checking the origin of a component includes checking the component that installed the update but in other embodiments other checks may be made such as where the update came from or how it was installed. Furthermore if the measurement does not match an attestation value and the attesting system has checked the origin of the corresponding component then performing one or more of: updating the attestation value with measurement of the new version of the component; and/or notifying an administration level that a measurement does not match an attestation value and whether the attesting system recognises the origin of the component.

In a second aspect of the invention there is provided a method for updating and attesting an operating system component in a hypervisor comprising: determining a new version of a component of a operating system; installing the new component version;
measuring an identifying characteristic of the component and making it available to an attestation system; notifying the attestation system that a component has been updated to a new version whereby; and whereby when the attestation system finds that the identifying characteristic of the new component does not match a pre-stored attestation value it is aware that a legitimate mis-match could have occurred.

In a third aspect of the invention there is provided a method of testing the integrity of a program comprising: extracting a component measurement stored by the program installation process; testing the component measurement with reference measurements stored by the testing system and failing the measurement if it does not match; further testing the failed component measurement and failing it again if it does not originate from another component known to the testing system; and indicating a pass if the component measurement passes one test and a fail if the measurement does not pass either of the tests.

A fourth aspect of the invention is provided as a system for updating code in an execution environment.

A fifth aspect of the invention is provided as a system for updating and attesting code in an execution environment.

A sixth aspect of the invention is provided as a system of testing the integrity of a program.

Viewed from a further aspect, the present invention provides a computer program product for updating code in an executing environment, the computer program product comprising:
a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

This specification presents a solution that allows a system to inform the attesting party of what to expect on the next Trusted Boot for a virtualised system using a virtual TPM.

BRIEF DESCRIPTION OF THE DRAWINGS

The present invention will now be described, by way of example only, with reference to preferred embodiments, as illustrated in the following figures.

DESCRIPTION OF THE EMBODIMENTS

Figure 1:
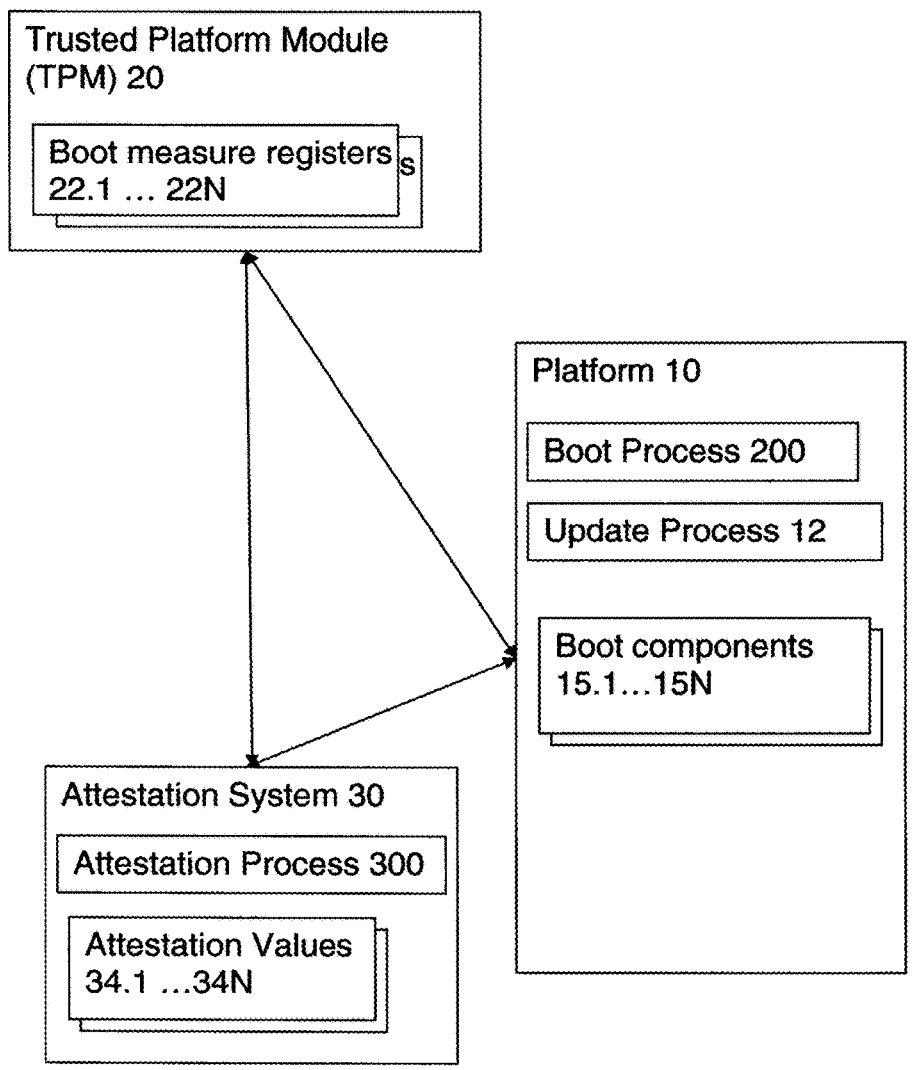
FIG. 1 is a schematic deployment diagram of a prior art trusted computing system, in accordance with the prior art, and in which a preferred embodiment of the present invention may be implemented.

FIG. 1 is a simplified deployment diagram of a prior art trusted system comprising: a platform 10; a Trusted Platform Module 20 (TPM 20) and an attestation system 30. Platform 10 comprises: a boot process 200 (described below and with reference to FIG. 2); an update process 12 and boot components 15.1 to 15N (here and elsewhere in this specification the letter N is used to represent a number but not any specific number). Boot components 15 include: boot components 15.1 to 15N. TPM 20 comprises platform configuration registers 22.1 to 22N. TPM 20 is shown deployed separate from the platform 10 but it could also be part of the platform 10. A platform configuration register PCR is also referred to as a register. Attestation system 30 comprises an attestation process 300 and attestation values 34.1 to 34N. Attestation system 30 is shown deployed separate from the platform.

Figure 2:
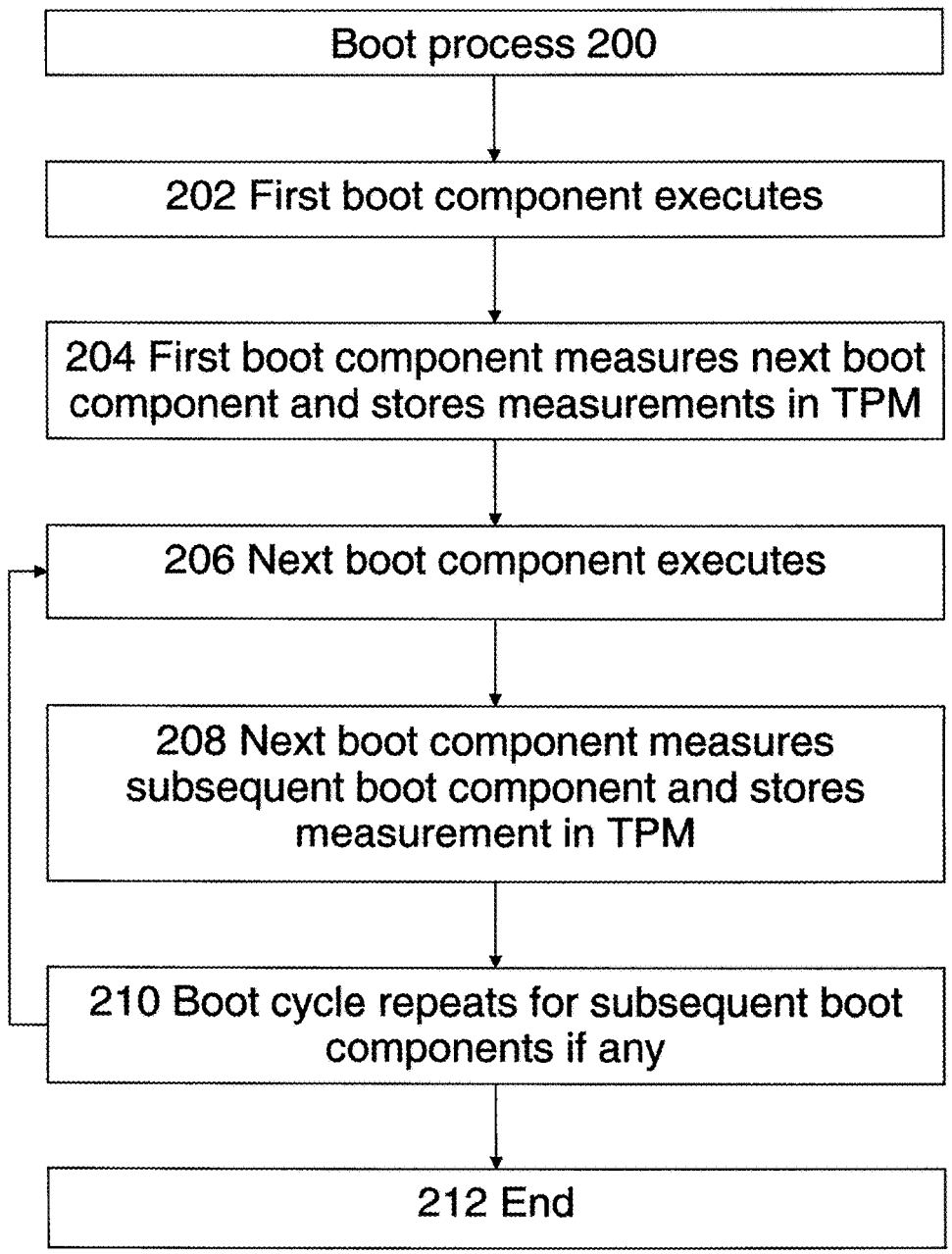
FIG. 2 is a schematic process diagram of the prior art trusted computing system, in accordance with the prior art, and in which a preferred embodiment of the present invention may be implemented.

FIG. 2 is a simplified process diagram of prior art boot process 200 comprising a sequence of steps 202 to 212 for executing a number of boot components in sequence as follows.

Step 202 is for executing the first boot component.

Step 204 is for measuring an identifying characteristic of the next boot component and storing the measurement in a register (for example 22.1).

Step 206 is for executing the next component.

Step 208 is for measuring an identifying characteristic of the subsequent boot component, if any, and storing the measurement in a subsequent register (for example 22.2).

Step 210 represents a boot cycle repeating the steps of 206 and 208 for any subsequent boot components.

Step 212 is the end of the process when there are no more boot components left.

In the preferred embodiment, a hypervisor performs initial steps (the equivalent steps 200, 202, 204 in the prior art) so that the measurement and execution starts in the hypervisor. For example, the hypervisor provides a hypercall "H-Measure" which measures and executes some code like a next boot component. In another example, platform firmware could perform the initial steps and start a subsequent boot component in a hypervisor.

Figure 3:
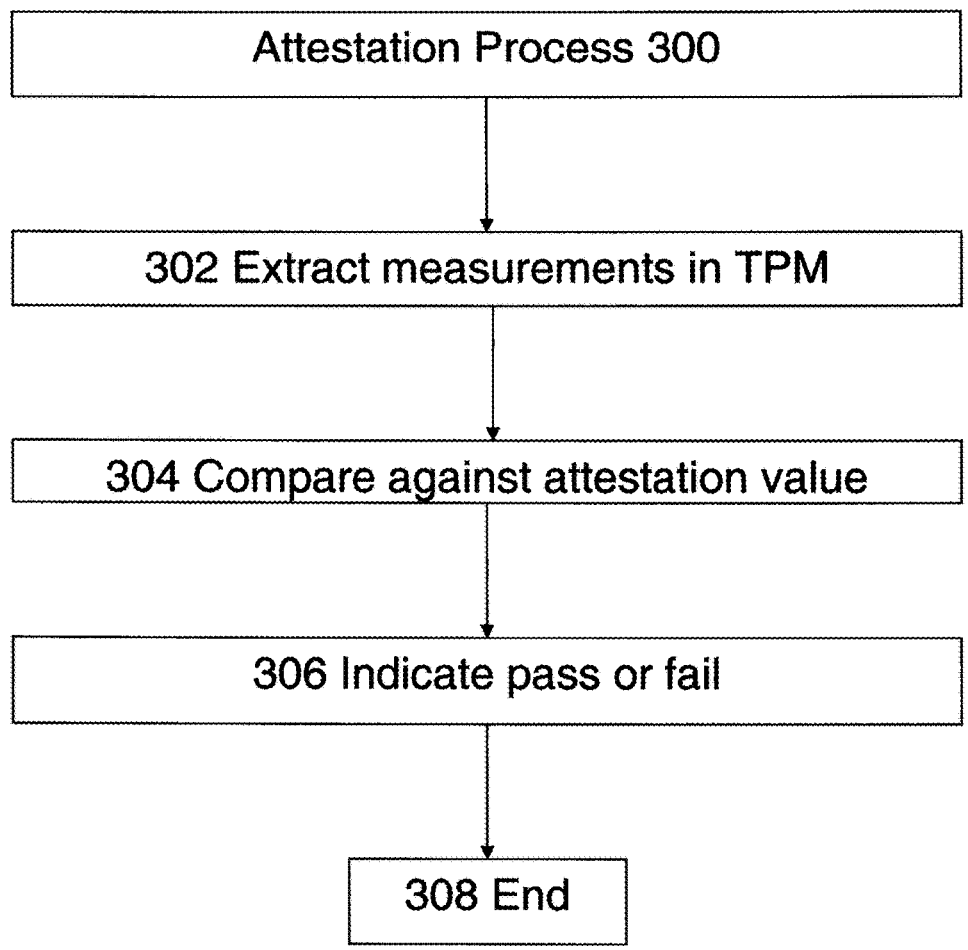
FIG. 3 is a schematic process diagram for attesting the prior art trusted computing system, in accordance with the prior art, and in which a preferred embodiment of the present invention may be implemented.

FIG. 3 is a simplified process diagram of prior art attestation process 300 comprising a sequence of logical steps 302 to 308 as described below. The attestation process executes after the trusted platform has booted.

Step 302 is for extracting measurements stored in registers.

Step 304 is for comparing the measurements with attestation values 34.1 to 34N stored by the attestation system 30.

Step 306 is for indicating 1) a pass if the values match the measurements or 2) a fail if there is a mismatch between the values and measurements.

Step 308 is the end of the process. The prior art attestation process trusts that the attestation values are correct and in the prior art the attestation values are updated by an administrator.

Figure 4:
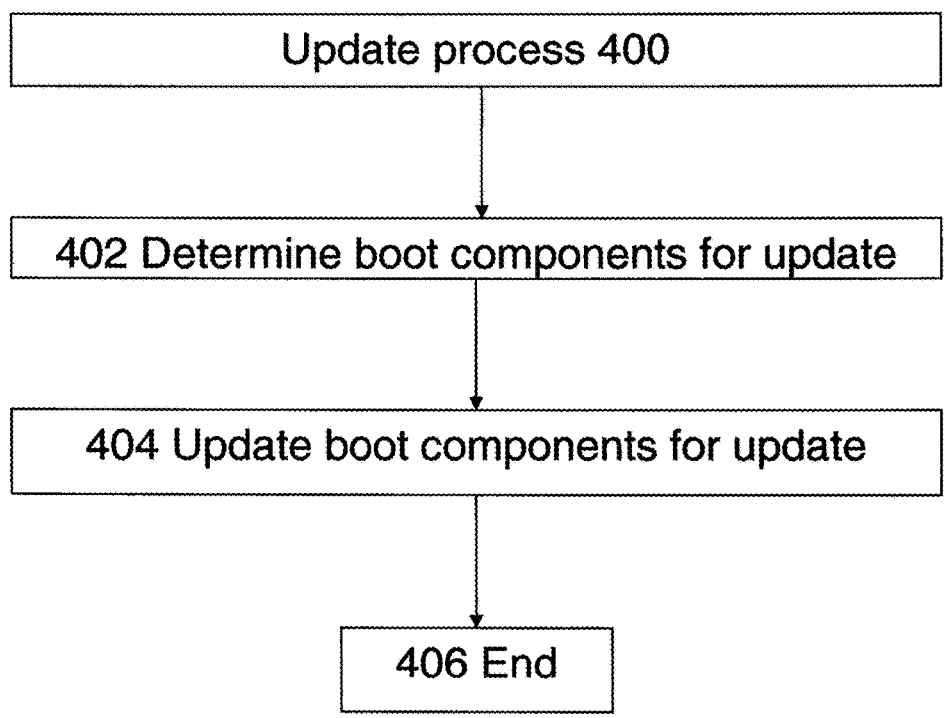
FIG. 4 is a schematic process diagram for updating the prior art trusted computing system, in accordance with the prior art, and in which a preferred embodiment of the present invention may be implemented.

FIG. 4 is a simplified process diagram of prior art update process 400 comprising a sequence of steps 402 to 406.

Step 402 is for determining that a component needs to be updated with a newer version of the component.

Step 404 is for updating the component by removing the old component and loading the new component.

Step 406 is the end of the process. In this process there is no identification that the component is a boot component and therefore no way of understanding that the update will have an impact of the attestation vale held by the attestation system.

Figure 5:
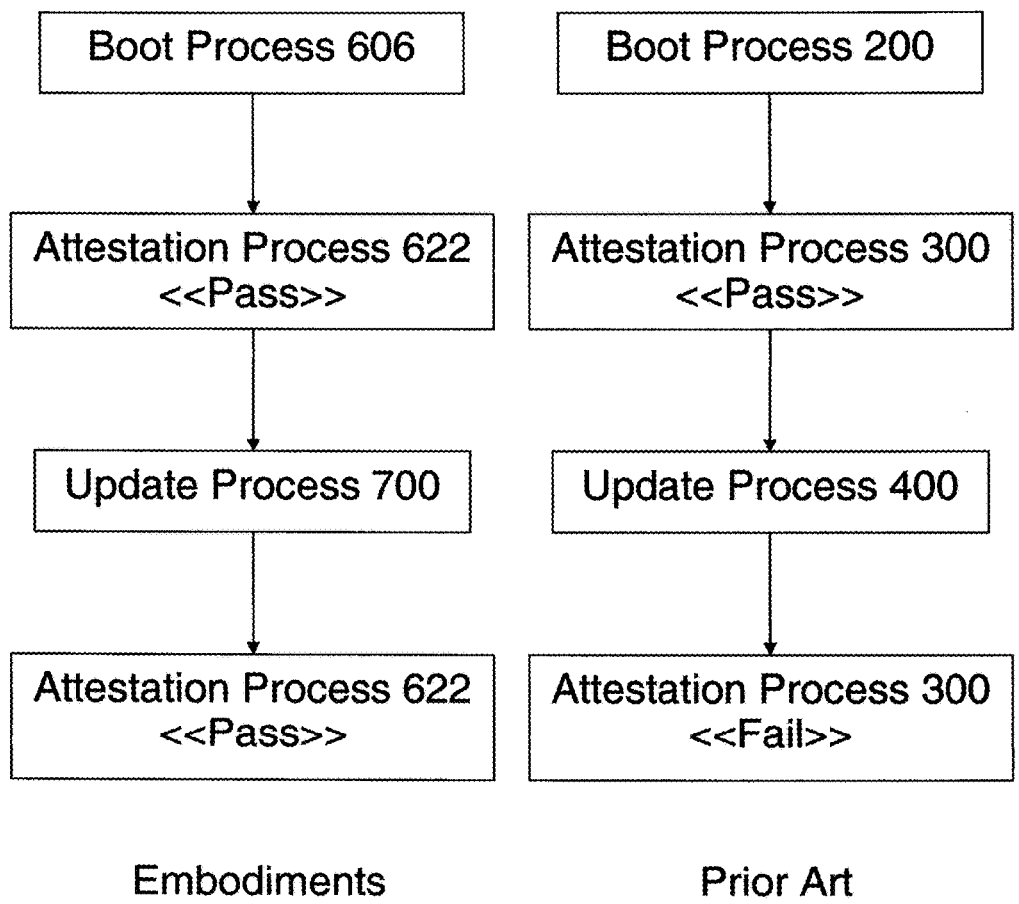
FIG. 5 is comparison diagram showing equivalent steps of an embodiment update process and the prior art update process, in accordance with the prior art, and in which a preferred embodiment of the present invention may be implemented.

FIG. 5 shows a comparison of results of the prior art trusted system and the results of the trusted system of the preferred embodiment.

A complete prior art update and attestation comprises the following combined processes in sequence: 200, 300, 400, and 300 again. Boot process 200 loads the boot components and each component is measured in turn; the measurements are stored in TPM 20. Attestation process 300 retrieves and tests the measurements against the stored attestation values and signals a pass because the values and measurements match. Update process 400 performs an update on one or more components including one or more boot components wherein the TPM measurement is changed. A further execution of attestation process 300 indicates a fail because there was no update to the attestation value and the attestation values and the TPM measurements do not match.

The preferred embodiment update and attestation process comprises the following combined process steps in sequence: 606, 622, 700, and 622 again. Boot process 606 loads the boot components; each boot component is measured and the measurements are stored in a TPM. An embodiment attestation process 622 retrieves and tests the measurements against the stored attestation values and signals a pass because the values and measurements match. Embodiment update process 700 performs an update on one or more boot components and changes the measurements in the TPM. In the preferred embodiment the attestation system is notified that the update has been performed. Attestation process 622 indicates a pass because it checks the origin of the update component.

In another embodiment the attestation values are updated with measurements established during the update.

Figure 6:
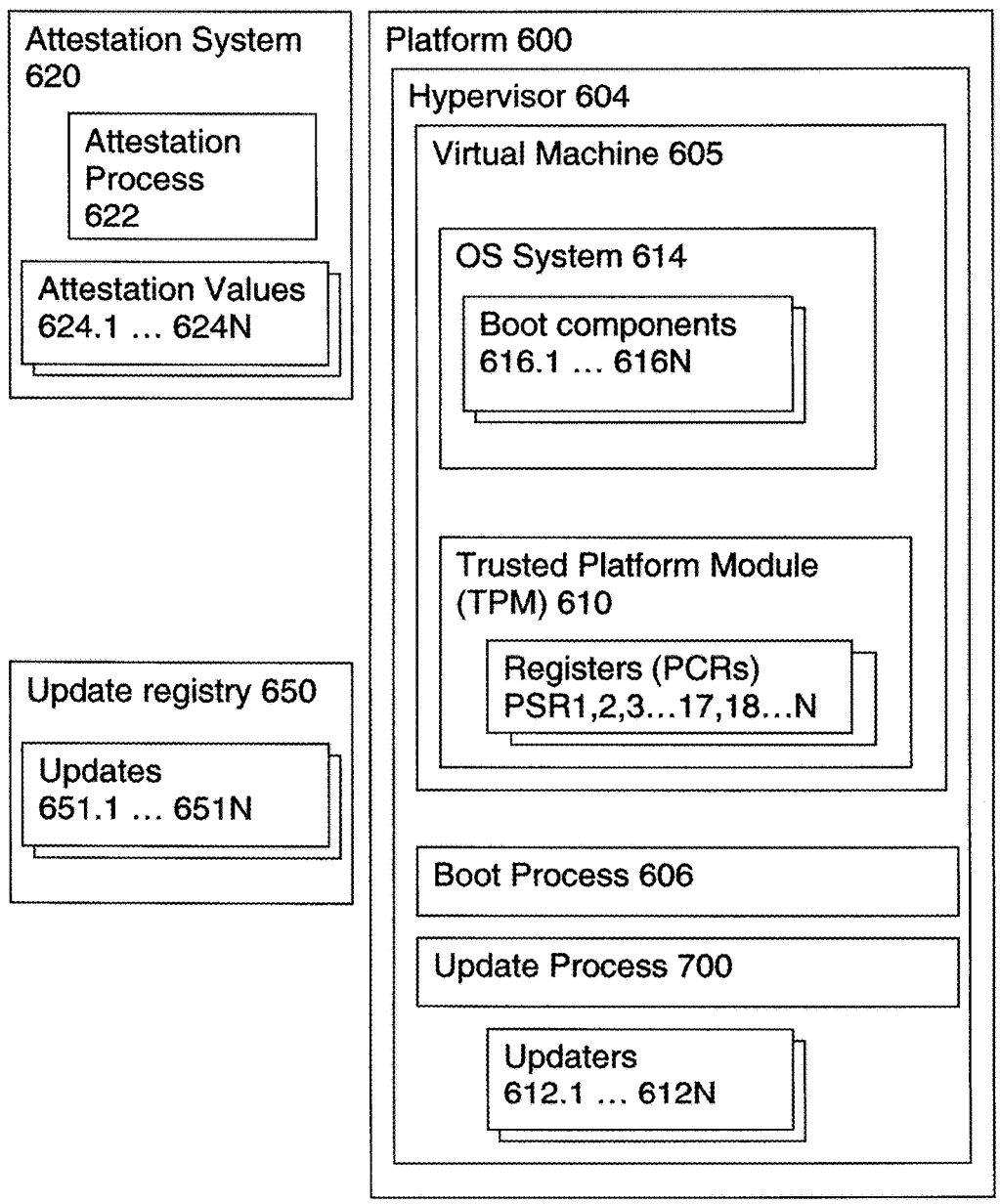
FIG. 6 is a schematic deployment diagram of a system, according to a preferred embodiment of the present invention.

FIG. 6 shows a schematic component diagram of the trusted computing system of the preferred embodiment. The trusted computing system comprises: platform 600; attestation system 620 and an update registry 650.

Update registry 650 is a storage resource and index for holding the latest versions of individual components of operating systems and applications that are for use in updating instances of the operating systems or applications. In the figure, update registry comprises updates 651.1 to 650N. Scanning component version numbers or dates in the update registry against component version numbers or dates of an operating system instance reveals which components that need updating.

In operation, platform 600 is a hardware platform with a hypervisor 604 for executing and managing virtual operating systems. An example of a platform is an IBM Power System. In operation Hypervisor 604 comprises: boot process 606; update process 700; updaters 612.1 to 612N; and a virtual machine hosting environment. The hypervisor of the present example creates a single virtual machine 605 in the hosting environment for a single operating system 614 but the preferred embodiment anticipates that more than one operating system could be updated on more than one virtual machine. Each virtual machine has a corresponding virtual TPM. Each virtual machine executing on a hypervisor is trusted by the attesting system. The trust is gained by a real TPM or by current and trusted signed updates and other security measures.

Virtual Trusted Platform Module 610 comprises a plurality of registers (PCRs) PCR1, 2, 3 . . . 17, 18 . . . N. Each PCR can store a measurement or value.

Updaters 612.1 to 612N comprise an example set of separate components, each associated with a respective boot component (616.1 to 616N) and each can update the operating system with a respective update (651.1 to 651N). For example, boot component 616.3 can be updated by updater 612.3 using update 651.3 and so on for boot component 616N, updater 612N and update 651N. Each updater comprises links to corresponding updates and boot components. Each updater is intended to be measured and then executed by the hypervisor. The measurement is stored in a first agreed register (for example PCR17). During execution, an updater measures the new component that it is installing and updates a second agreed register (for example PCR18). Note that the updater may just be copying something or, on the fly, creating the component. For example, updater "bosboot" generates a new operating system component image on the fly from many configuration files and system data.

In a preferred embodiment the updater is adapted to notify the attesting system directly that the operating system has been updated. This might mean that the updater making direct contact with the attestation system or getting some common process on the hypervisor to make contact. Virtual OS System 614 (for example IBM AIX*), when loaded by the hypervisor, comprises boot components 616.1 to 616N that are loaded as part of the boot process to provide a functioning virtual operating system with applications, data and interfaces. Other operating system components that are not part of the boot process are not shown.

Boot process 606 comprises a process the same as prior art boot process 200.

Attestation system 620 comprises: attestation process 622 and attestation values 624.1 to 624N. Attestation system 620 and hypervisor 604 have an agreement over which registers (PCR1 . . . N) are used to record the measurement of the updater and the signature of the changed component (also called the identifying characteristic). In the preferred embodiment, these agreed registers are called first agreed register and second agreed register. For instance, in the example, the first and second agreed registers are PCR17 and PCR18.

The attestation system needs to attest the registers in the TPM. All the register values will be transferred using an attestation protocol where digital signatures and other security mechanisms are used to keep the trust. The attestation system can detect if the agreed registers (for example first and second agreed registers PCR17 and 18) are set and is able to prepare for the reboot and subsequent change of the currently trusted registers (for example PCR1, 2 and 3).

The attestation system will read the first agreed register (for example PCR17) and determine that the updater is a trusted updater. This is determined by: looking at a master list of measurements for known and trusted updaters; and looking at a trusted boot event log that has been updated with meta-data for every change to the registers. When the attestation system finds that the first agreed register contains a trusted value then it assumes that second agreed register also contains a trust-worthy value to be used when next comparing the boot register associated with the updater detected in the update.

Figure 7:
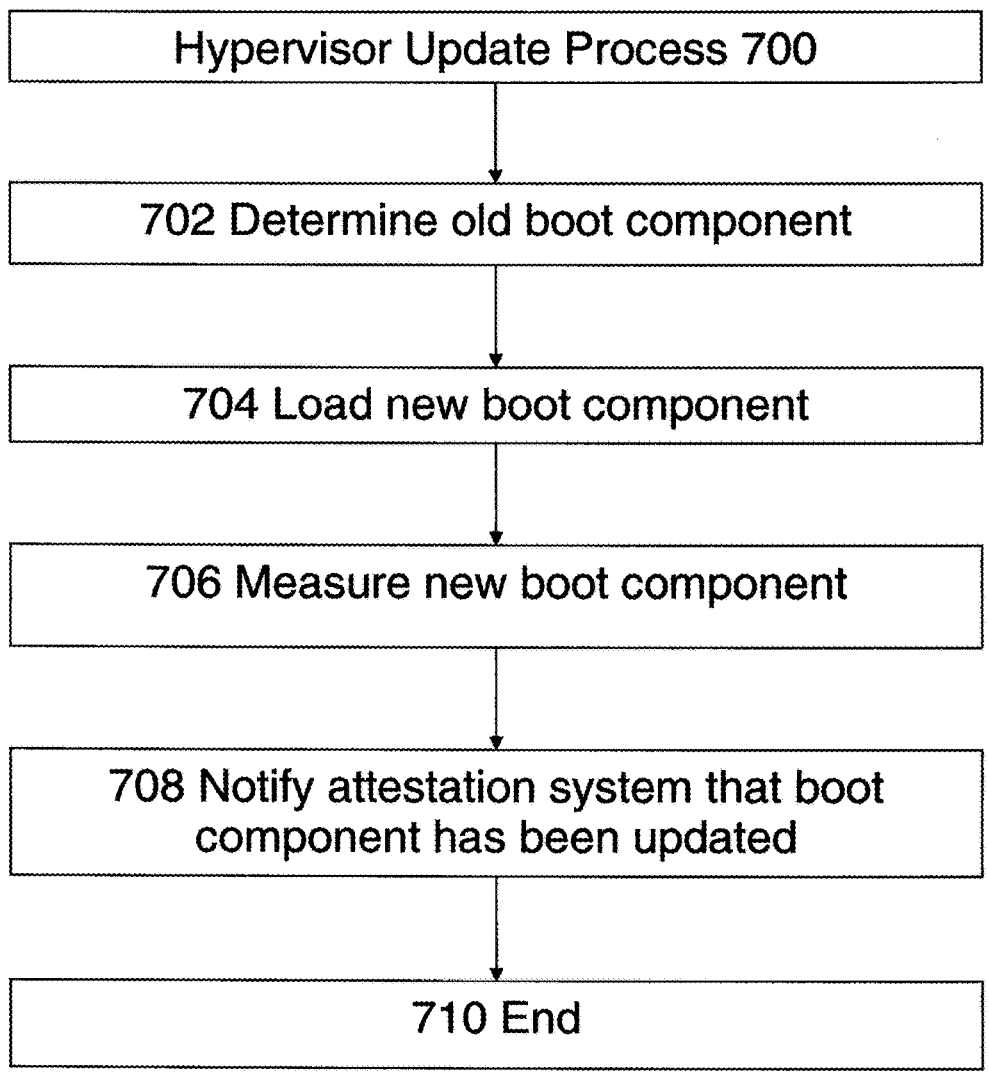
FIG. 7 is a schematic process diagram of the update process, according to a preferred embodiment of the present invention.

Referring to FIG. 7, hypervisor update process 700 comprises process logic steps 702 to 710.

Step 702 is for determining that a boot component has an available update by scanning the update registry 650 for more recent components. For instance, Virtual OS System 614 boot component 616.3 comprises version 1 of the AIX boot image (AIX Boot Image1) but update 651.3 in update registry 650 has been loaded with version 2 of the AIX boot image (AIX Boot Image2). This is preferred but in other embodiments a different mechanism may be used to determine when to update.

Step 704 is for loading the new boot component by activating the associated updater (for example updater 612.3) and wherein the associated updater is adapted to update the boot component; the associated updater accesses the new boot component and installs the new boot component over or instead of the old boot component. The above description is the essential operation of the boot loading step and further more detailed operation of the boot loading step is described with respect to FIG. 8 below.

Step 706 is for measuring a new boot component after it has been loaded into the virtual operating system so that the new measurement uniquely identifies the new boot component in location in the virtual operating system. The new measurement is added to a specific register in the Trusted Platform Module. In the preferred embodiment the attestation system 620 looks for and understands that the specific register holds a new measurement and not an old one.

Step 708 is for notifying the attestation system 620 that a boot component has been updated.

Step 710 signals the end of update process 700.

Figure 8:
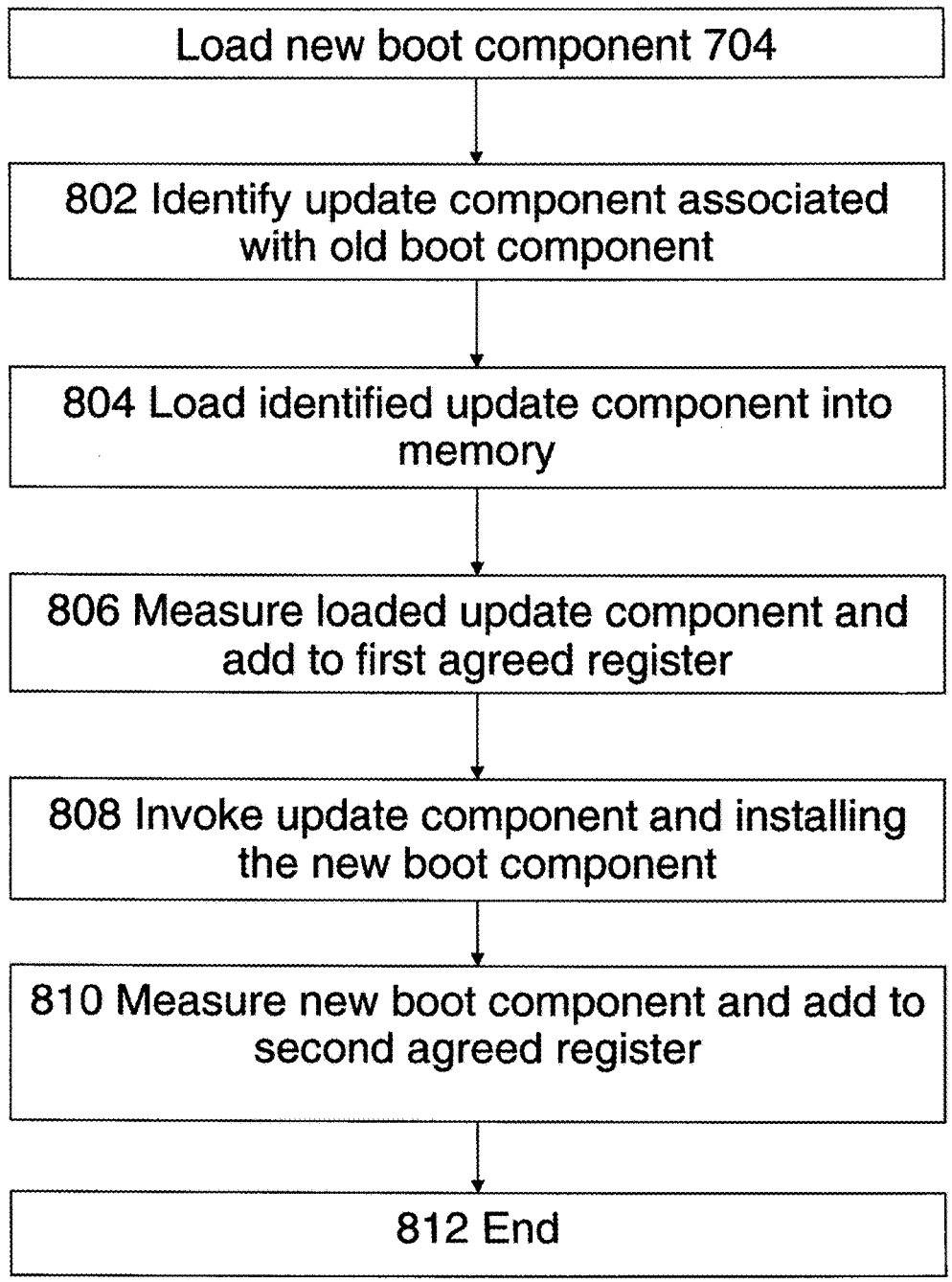
FIG. 8 is a process diagram of new component loading process, according to a preferred embodiment of the present invention.

Whilst step 704 of loading a new boot component is described above as a simple embodiment of the invention, the preferred embodiment of the invention uses further processing to increase the level of confidence. Load new boot component process 704, as described below and referencing FIG. 8, is a preferred embodiment of the invention and comprises process steps 802 to 812.

Step 802 is for identifying an update component associated with the boot component. In the example below, a program called bosboot is invoked to re-write the AIX Boot Image1 with AIX Boot Image2.

Step 804 is for loading the identified updater into the operating system.

Step 806 is for measuring the updater component and adding the measurement to the first agreed register. In the example below, a program called Hypercall measures bosboot and extends the first agreed register (for example PCR17) within the TPM.

Step 808 is for invoking the updater to install the update component. In the example below, Bosboot writes the new boot-image.

Step 810 is for measuring the new boot component and adding the measurement to the second agreed register.

Step 812 is the end of the load new boot component process 704.

Figure 9:
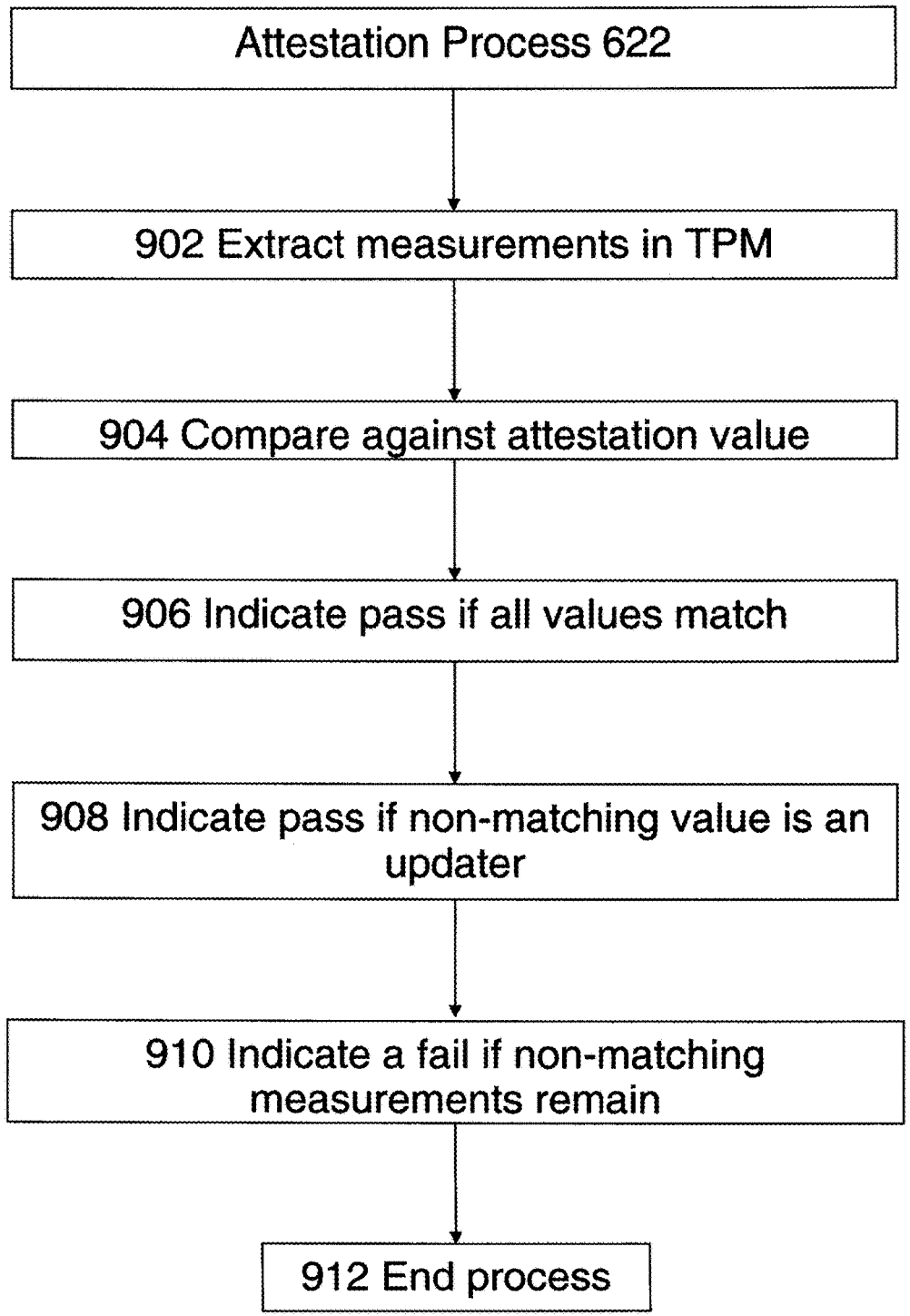
FIG. 9 is a process diagram of attestation process, according to a preferred embodiment of the present invention.

Referring to FIG. 9, there are described logical process steps 902 to 910 of attestation process 622 according to the preferred embodiment. The attestation process executes after the trusted platform has booted but is independent of the trusted platform.

Step 902 is for extracting measurements stored in registers.

Step 904 is for comparing the measurements with attestation values 624.1 to 624N stored by the attestation system 620.

Step 906 is for indicating a pass if the values match the measurements.

Step 908 is for indicating a pass if any non-matching boot measurements from step 906 match a known updater.

Step 910 is for indicating a fail if there are non-matching boot measurement after steps 908 and 910.

Step 912 is for indicating the end of the process.

EXAMPLE

An example of the operation of the preferred embodiment comprises an IBM Power* system hosting an IBM Power Hypervisor (PHYP) with a single virtual AIX system. The AIX system uses a virtual TPM device and incorporates trusted boot functionality. The system is monitored and attested by a separate attestation system. When attested the following PCR measurements are returned where PCR1, PCR2, PCR3 are registers in the TPM.

PCR1=Open-Firmware
PCR2=AIX Boot-Image
PCR3=AIX Trusted Execution Database

The attestation system considers these measurements to be trusted and will not flag a security issue when they are returned via attestation. In order to allow the AIX boot-image to be modified and for the attestation system to be informed of this update the following features also exist.

PHYP is modified so that it has a new method (referred to as a hypercall and specifically H_Measure). H_Measure takes parameters describing something to be measured and executed, for example, address and length. The resulting measurement is placed in a particular register of the TPM, for example, PCR17. The particular boot register is not important but can be an absolute addressed register or an indirectly addressed register. The importance is that the attestation system understands where to look. PHYP returns control to AIX at the address passed, the critical difference is that the hyper-call is used firstly to measure a component and then secondly to execute the same component. What is measured is then executed.

In order to work, the hypervisor too must be trusted. In the prior art hypervisor trust is gained by the IBM Power System having a very restrictive way of updating the PHYP code and only IBM Power System signed updates can be installed. In the present embodiment the IBM POWER System has a real TPM device and that PHYP is measured into the real-TPM. A technique known as deep-attestation can be used to retrieve the real TPM measurements via the virtual AIX system.

A defined set of AIX programs, referred to as updaters in the specification, are allowed to change components of the trusted boot. In this example, bosboot is defined as being the only updater program that can legally update the AIX boot-image. The technique requires that bosboot can be trusted and therefore when bosboot is built, a digital signature of bosboot is taken and publicised. In order for H_Measure to be able to measure bosboot successfully, bosboot should be a single static piece of code that can be loaded into a contiguous piece of memory for the measurement to take place. It is important that bosboot is measurable. Bosboot does not have to be static if other security measures are in place to ensure that non-static programs can't be subverted easily.

In this example AIX Boot-Image1 will be changed to AIX Boot-Image2 informing the attestation system such that an unnecessary security violation is prevented. The operations are as follows:

1. bosboot (an updater) is invoked (step 702) to re-write the boot-image.
2. The AIX kernel loads (step 704) bosboot into memory and calls H_Measure.
3. PHYP measures (step 706) bosboot and extends PCR17 within the TPM.
4. Execution is passed to bosboot by the hypervisor and bosboot writes the new boot-image and extends PCR18 with a measurement of AIX Boot-Image2. Again just like PCR17, it is not important which register is used, as long as the attesting system knows that PCR18 has a special meaning.
5. The attestation system is informed (step 708) that it should re-attest, no more information need be exchanged.

Now when the attestation system attests the system the following values are returned (step 902).
PCR1=Open Firmware
PCR2=AIX Boot-Image1
PCR3=AIX Trusted-Execution Database1
PCR17=bosboot
PCR18=AIX Boot-Image2

The attestation system will see that PCR17 has changed since the last attestation, this triggers an action (step 908) in the attestation system. Firstly the value of PCR17 is checked, it sees that a legal, IBM published bosboot was invoked, therefore it knows that PCR18 will be a new AIX boot-image. Now when the attested system completes a new trusted boot, the attestation system can see that the new value reported via PCR1 came from a trusted bosboot and no action is required.

Embodiments

The preferred embodiment, using a hypervisor to manage a virtual machine operating environment, is described above including other embodiments where a single feature may depart from the preferred embodiment in some way.

Figure 10:
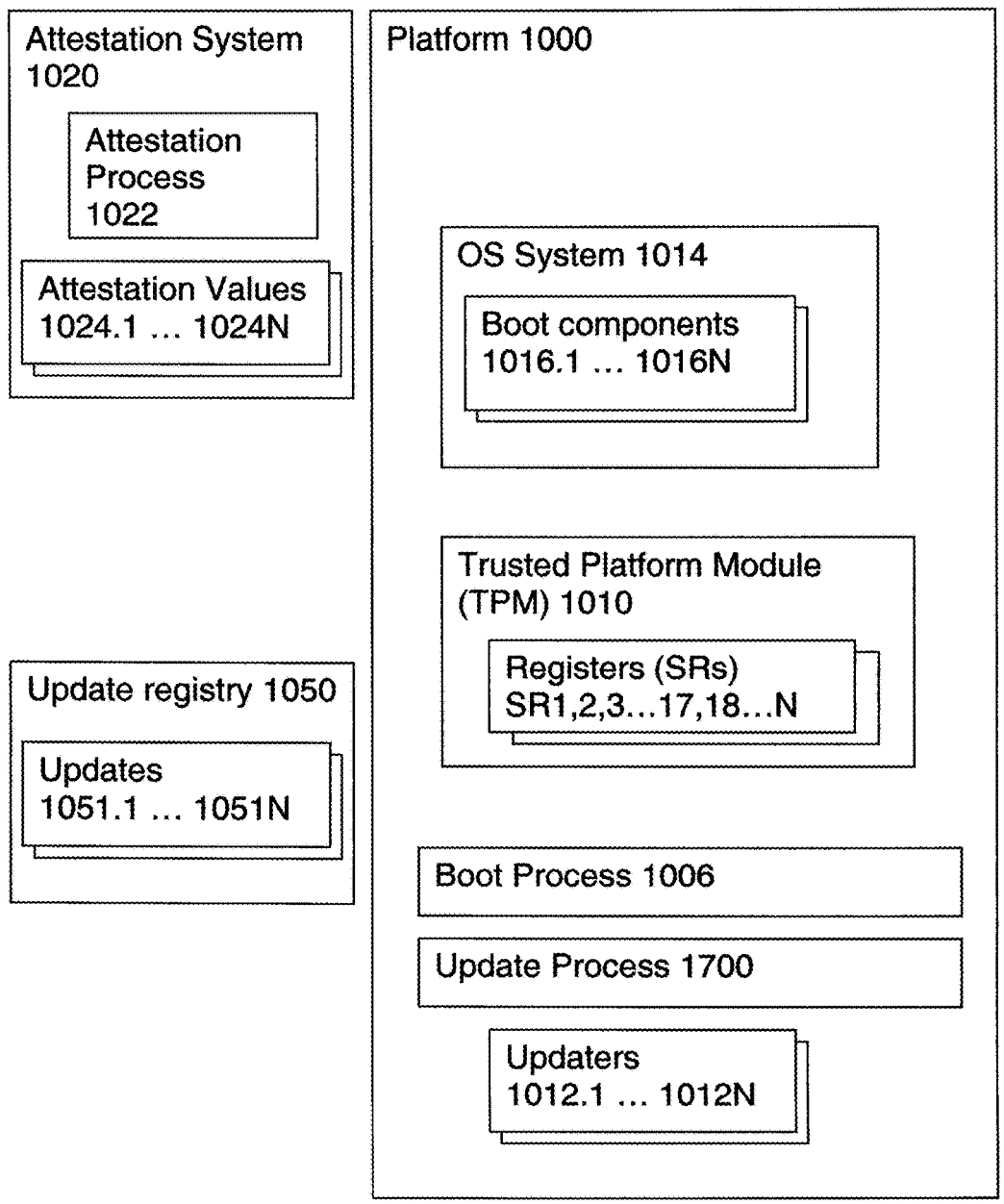
FIG. 10 is a schematic deployment diagram of a system of a physical embodiment.

An embodiment that departs from the preferred embodiment in a major way considers an embodiment with no virtualization, a non-virtual embodiment as shown in FIG. 10. This embodiment comprises: platform 1000; attestation system 1020 and an update registry 1050. Platform 1000 designed and manufactured in silicon. Like the preferred embodiment TPM 1010 is not an essential part and some other secure device/storage could be used that holds measurements and something like attestation.

Update registry 1050 is a storage resource and index for holding the latest versions of individual components of operating systems and applications that are for use in updating instances of the operating systems or applications. In the figure, update registry comprises updates 1051.1 to 1050N. Scanning component version numbers or dates in the update registry against component version numbers or dates of an operating system instance reveals which components that need updating.

Attestation system 1020 comprises attestation process 1022 and attestation values 1024.1 1024N. Apart from the difference that the operating system is a real operating system running on a physical machine the attestation process 1022 and attestation values 1024.1 ... 1024N are the similar to those shown in FIG. 6.

In operation, platform 1000 is a hardware platform comprises: boot process 1006; update process 1700; updaters 1012.1 to 1012N; TPM 1010; and operating system 1014. Like the preferred embodiment TPM 1010 is not an essential part and some other secure device/storage could be used that holds measurements and something like attestation.

In the non-virtual embodiment, a TPM 1010 comprises special registers (SR1 ... SRN) which can be used to hold measurements. SRs behave just like PCRs in that a write to them is really a write of a new value combined with the old value and then hashed using a strong hash algorithm. The processor has instructions which allow these special registers (SRs) to be updated. The processor is modified to have a Measure instruction. This instruction takes an identifier for an SR, memory address and a length. It measures the data at the address (and all bytes up to length) then stores the measurement in the specified SR. The processor transfers execution to the address.

In the non-virtual embodiment, platform 1000 will need to update some code and there is update code associated with the some code for performing the update. The associated code is loaded into memory then the Measure instruction is used to measure and execute the associated code. The measurement is placed in a first agreed register. The executed associated code can now install the some code, this is probably just writing data to disk. Before the write, or before each write (if there is some write n-bytes limitation) measurements are taken and written into a second agreed register (an SR and this correlates to the update of the second agreed register PCR18).

In the non-virtual embodiment, platform 1000 must inform an attesting system 1020 that an update has occurred. As with the preferred embodiment attestation system 1020 attests, this transfers the values of the SRs using cryptographic techniques to maintain trust. Attestation process 1022 is similar to the preferred embodiment.

It will be clear to one of ordinary skill in the art that all or part of the method of the described embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the described embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the described embodiments of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

Summary of Preferred Embodiment

In summary this invention relates to a method and apparatus for updating an operating system executing in a trusted computing hypervisor environment. In particular this invention relates to a method, system and computer program for updating an operating system executing in a hypervisor environment comprising: determining a new version of a component of an operating system; installing the new component version;
measuring an identifying characteristic of the component and making it available to an attestation system; notifying the attestation system that a component has been updated to a new version whereby, when the attestation system finds that the identifying characteristic of the new component does not match a pre-stored attestation value it is aware that a legitimate mis-match could have occurred. The installing of the new version of the component comprises: identifying an updater associated with new version of the component; measuring an identifying characteristic of the identified updater; loading and installing the new version of the component; and making both the identifying measurement of the updater and the new version of the component available to the attestation system.

NOTICES

*IBM, AIX, Express, ibm.com, Power, Power7 and Tivoli are trademarks or registered trademarks of International Business Machines Corporation in the United States, other countries or both. A full list of U.S. trademarks owned by IBM may be found at: www.ibm.com/legal/copytrade.shtml.

What is claimed is:

1. A method comprising:
installing, with respect to a set of boot components in a chain of trust, new code forming part of the chain of trust during a boot process in an execution environment;
measuring an identifying characteristic of the new code;
modifying a pre-stored attestation value corresponding to the chain of trust to create a revised attestation value by adding the identifying characteristic of the new code;
making the revised attestation value available to an attestation system;
notifying the attestation system that the revised attestation value corresponds to the chain of trust including the new code;
responsive to the attestation system finding that the identifying characteristic of the new code matches the revised attestation value, validating the new code in the executing environment;
detecting, by the attestation system, a set of agreed registers to store the identifying characteristic for the new code, wherein the set of agreed registers includes both a first agreed register having a first attestation value and a second agreed register having a second attestation value; and
identifying a first boot event in a trusted boot event log including a set of metadata indicating updates to the set of agreed registers.

2. The method of claim 1, further comprising:
establishing, using a hypervisor, the chain of trust for the set of boot components, wherein the hypervisor represents a trust anchor for the chain of trust.

3. The method of claim 2, further comprising:
preventing access to the attestation system by the hypervisor.

4. The method of claim 1, further comprising:
updating, without breaking the chain of trust, a software version of the set of boot components.

5. The method of claim 1, further comprising:
determining, by the attestation system in response to reading the first attestation value of the first agreed register, that a first updater measures a first trusted value;
inferring, by the attestation system, in response to determining that the first updater measures the first trusted value, that the second attestation value of the second agreed register measures a second trusted value; and
comparing the second attestation value to a measured value of a second updater.

6. The method of claim 5, further comprising:
identifying, to determine that the first updater measures the first trusted value, the first updater in a master list of trusted updaters.

7. A system comprising:
a memory having a set of computer readable computer instructions, and a processor for executing the set of computer readable computer instructions, the set of computer readable computer instructions including:
  installing, with respect to a set of boot components in a chain of trust, new code forming part of the chain of trust during a boot process in an execution environment;
  measuring an identifying characteristic of the new code;
  modifying a pre-stored attestation value corresponding to the chain of trust to create a revised attestation value by adding the identifying characteristic of the new code;
  making the revised attestation value available to an attestation system;
  notifying the attestation system that that the revised attestation value corresponds to the chain of trust including the new code;
  responsive to the attestation system finding that the identifying characteristic of the new code matches the revised attestation value, validating the new code in the executing environment;
  detecting, by the attestation system, a set of agreed registers to store the identifying characteristic for the new code, wherein the set of agreed registers includes both a first agreed register having a first attestation value and a second agreed register having a second attestation value; and
  identifying a first boot event in a trusted boot event log including a set of metadata indicating updates to the set of agreed registers.

8. The system of claim 7, wherein the program installation process for the set of boot components comprises:
  determining, by the attestation system in response to reading the first attestation value of the first agreed register, that a first updater measures a first trusted value;
  inferring, by the attestation system, in response to determining that the first updater measures the first trusted value, that the second attestation value of the second agreed register measures a second trusted value; and
  comparing the second attestation value to a measured value of a second updater.

9. The system of claim 8, further comprising:
identifying, to determine that the first updater measures the first trusted value, the first updater in a master list of trusted updaters.

10. The system of claim 7, further comprising:
establishing, using a hypervisor, the chain of trust for the set of boot components, wherein the hypervisor represents a trust anchor for the chain of trust.

11. The system of claim 7, further comprising:
identifying, to determine that the first updater measures the first trusted value, the first updater in a master list of trusted updaters.

12. A system comprising:
a memory having a set of computer readable computer instructions, and
a processor for executing the set of computer readable instructions, the set of computer readable instructions including:
  program instructions to load, using a boot process, a first set of boot components in a chain of trust;
  program instructions to store, in a platform configuration register, a first set of boot component measurements for the first set of boot components, the first set of boot component measurement representing a first set of attestation values for use in verifying the chain of trust;
  program instructions to load, with respect to the first set of boot components, an update forming part of the chain of trust during a boot process in an execution environment, the update creating a second set of boot components;
  program instructions to detect, for the second set of boot components, a second set of boot component measurements;
  program instructions to store, in the platform configuration register, the second set of boot component measurements as a second set of attestation values;
  program instructions to notify an attestation system that the second set of attestation values correspond to the chain of trust including the update;
  program instructions to retrieve, by an attestation process performed by the attestation system, based on the notice, the second set of attestation values for attestation of the chain of trust;
  program instructions to compare, by the attestation process, the second set of boot component measurements with the second set of attestation values;
  program instructions to determine, by the attestation process and based on comparing the second set of boot component measurements with the second set of attestation values, a pass indication for the chain of trust including the update; and
  program instructions to perform, in response to determining the pass indication for the chain of trust, the update for the second set of boot components.

13. The system of claim 12, storing, in the platform configuration register, the second set of boot component measurements as a second set of attestation values includes:
  modifying the first set of boot component measurements in the platform configuration register.

14. A computer program product comprising a non-transitory computer-readable storage medium having a set of instructions stored therein which, when executed by a processor, causes the processor to validate new code by:
  installing, with respect to a set of boot components in a chain of trust, new code forming part of the chain of trust during a boot process in an execution environment;
  measuring an identifying characteristic of the new code;
  modifying a pre-stored attestation value corresponding to the chain of trust to create a revised attestation value by adding the identifying characteristic of the new code;
  making the revised attestation value available to an attestation system;
  notifying the attestation system that that the revised attestation value corresponds to the chain of trust including the new code;
  responsive to the attestation system finding that the identifying characteristic of the new code matches the revised attestation value, validating the new code in the executing environment;
  detecting, by the attestation system, a set of agreed registers to store the identifying characteristic for the new code, wherein the set of agreed registers includes both a first agreed register having a first attestation value and a second agreed register having a second attestation value; and
  identifying a first boot event in a trusted boot event log including a set of metadata indicating updates to the set of agreed registers.

15. The computer program product of claim 14, further causing the processor to validate new code by:
  determining, by the attestation system in response to reading the first attestation value of the first agreed register, that a first updater measures a first trusted value;
  inferring, by the attestation system, in response to determining that the first updater measures the first trusted value, that the second attestation value of the second agreed register measures a second trusted value; and
  comparing the second attestation value to a measured value of a second updater.

16. The computer program product of claim 15, further causing the processor to validate new code by:
  identifying, to determine that the first updater measures the first trusted value, the first updater in a master list of trusted updaters.

17. The computer program product of claim 14, further causing the processor to validate new code by:
  establishing, using a hypervisor, the chain of trust for the set of boot components, wherein the hypervisor represents a trust anchor for the chain of trust.

18. The computer program product of claim 17, further causing the processor to validate new code by:
  preventing access to the attestation system by the hypervisor.

19. The computer program product of claim 14, further causing the processor to validate new code by:
  updating, without breaking the chain of trust, a software version of the set of boot components.

* * * * *